C. P. PFEIL.
APPARATUS FOR ACTUATING TOY VEHICLES AND THE LIKE.
APPLICATION FILED OCT. 23, 1911.

1,022,258.

Patented Apr. 2, 1912.

Witnesses:

Inventor:
Christian P. Pfeil
by B. Singer
Atty

UNITED STATES PATENT OFFICE.

CHRISTIAN PAUL PFEIL, OF NUREMBERG, GERMANY.

APPARATUS FOR ACTUATING TOY VEHICLES AND THE LIKE.

1,022,258.   Specification of Letters Patent.   Patented Apr. 2, 1912.

Application filed October 23, 1911. Serial No. 656,184.

*To all whom it may concern:*

Be it known that I, CHRISTIAN PAUL PFEIL, a subject of the King of Bavaria, residing at 70 Denisstrasse, Nuremberg, Bavaria, Germany, have invented certain new and useful Improvements in Apparatus for Actuating Toy Vehicles and the Like, of which the following is a specification.

Apparatus for actuating toy vehicles are known comprising a flywheel which is caused to revolve rapidly by means of a crank handle or by rotating the running wheels of the toy, the toy being then propelled along the ground by the momentum of the flywheel. Such known apparatus have, however, the drawbacks that the mechanism of the apparatus is composed of a great number of parts and that it is inconvenient to drive the flywheel, and that the propulsion of the vehicle is usually only very short. These drawbacks are removed by the present invention according to which the improved apparatus comprises a driving spring connected by means of a ratchet mechanism or the like to the running wheels in such a manner that the tensioned spring drives the driving wheels and also the flywheel, and when the spring has run down the ratchet mechanism is disengaged and the further propulsion of the vehicle is effected by the flywheel. In the improved apparatus only a short tensioning of the spring is required to drive the apparatus, said tensioning being produced preferably by propelling the vehicle or its running wheels backward.

One embodiment of the invention is illustrated by way of example in the accompanying drawings in which:—

Figure 1:
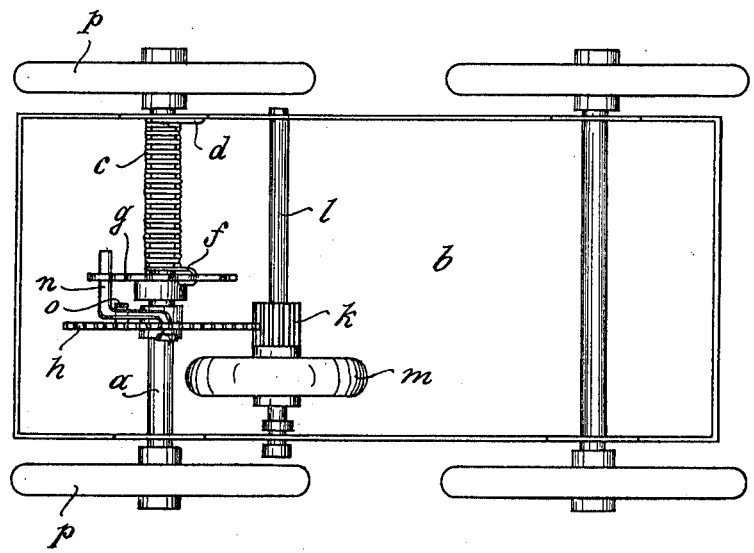
Figure 2:
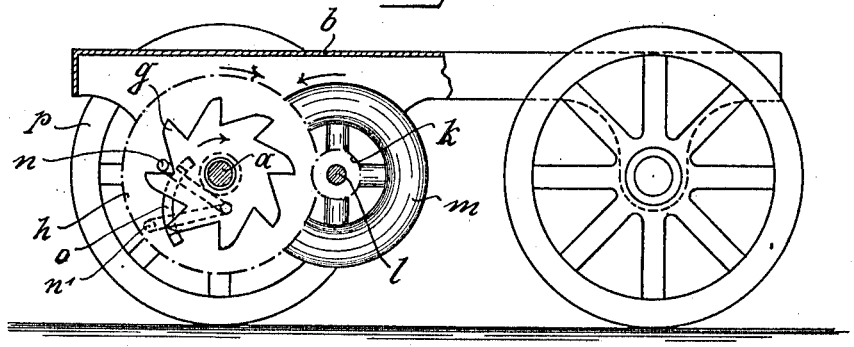

Figures 1 and 2 are respectively an underside view and a side elevation of the improvements applied to a toy vehicle.

$a$ is a running wheel axle of the toy vehicle $b$; on it is mounted a spiral spring $c$ which is attached at one end $d$ to the vehicle $b$ and at its other end $f$ to a ratchet wheel $g$ loose on the axle $a$.

$h$ is a toothed wheel fixed on the axle $a$; it drives by means of a toothed wheel $k$ a flywheel $m$ mounted on the shaft $l$.

$n$ is a crank arm mounted to rock on a pivot located eccentrically on the toothed wheel $h$. This crank arm is guided by a bent piece $o$ and in one end position it engages the ratchet wheel $g$; in its other end position it is out of gear with the said ratchet wheel.

The operation of the improved apparatus is as follows:—The spring $c$ is tensioned by the vehicle being propelled backward so that the running wheels $p$ which bear on the ground cause the axle $a$ on which they are fixed, to revolve backward. The toothed wheel $h$ which is fixed on the axle $a$, rotates also the ratchet wheel $g$ by means of the crank $n$ and thereby tensions the spring $c$. When the vehicle is released, the spring $c$ drives the ratchet wheel $g$ in the reverse direction, and the toothed wheel $h$ is likewise driven by the ratchet wheel by means of the crank $n$ engaging the teeth of wheel $g$. The toothed wheel $h$ fixed on the axle $a$ drives the running wheels $p$ and the flywheel $m$ is driven at the same time by means of the toothed wheel $k$. As soon as the spring $c$ has run down, the ratchet wheel $g$ stops, but the toothed wheel $h$ continues to revolve and is now driven by the momentum of the revolving flywheel. The crank $n$ which was previously engaged in the teeth of the ratchet wheel $g$, slips over the said teeth and is thrown outward by centrifugal action so that it moves out of contact with the ratchet wheel and thus avoids all friction. The toy vehicle will now continue to be propelled until the flywheel $m$ has given up its driving power.

The spring $c$ of the improved apparatus requires only to be tensioned to a very small degree, whereas the vehicle is effectively propelled because the tensioned spring uncoils with great rapidity and thereby drives the flywheel with great speed.

The vehicle may also be driven as in the known constructions by rolling the running wheels quickly along the ground in the forward direction after having previously disconnected the spring. By this means the apparatus cannot be damaged because the toy vehicle can be driven in both directions. The improved apparatus is shown in the drawings applied by way of example to a toy vehicle, but it may also be adapted to any running or walking figure or the like.

It is to be understood that the ratchet mechanism may be modified or replaced by a different mechanism, and that any other kind of spring may be employed instead of the spiral spring shown in the drawings.

What I claim is:—

1. In apparatus for actuating toy vehicles and the like, the combination with a running wheel axle of the toy, of a driving spring, means for coupling said spring to said axle, a flywheel carried by the vehicle, reversible mechanism for transmitting the effort of the said spring so as to drive said flywheel, and means for reversing said reversible mechanism when said spring has run down, whereby when said spring is tensioned and then released, it will drive the running wheel axle to propel the toy and at the same time drive the flywheel which latter will continue to propel the toy after said spring has run down as set forth.

2. In a toy driving apparatus, the combination with the toy body, of a wheeled axle therefor, a fly wheel operatively connected with said axle, a spring for driving said axle, and a self releasing ratchet mechanism for rotating said fly wheel from the impulse of said spring, substantially as and for the purpose set forth.

3. In apparatus for actuating toy vehicles and the like, the combination with a running wheel axle of the toy, of a spring for driving said axle to propel the toy, a flywheel carried by the toy, a ratchet wheel loose on said axle, a toothed wheel fixed on said axle, a pinion fixed to said flywheel, gearing with said toothed wheel and a pawl carried by said toothed wheel adapted to engage and drive said ratchet wheel, as set forth.

4. In apparatus for actuating toy vehicles and the like, the combination with a running wheel axle, of a spring for driving said axle to propel the toy, a flywheel carried by the toy, a ratchet wheel loose on said axle, a toothed wheel fixed on said axle, a pinion fixed to said flywheel, gearing with said toothed wheel and a crank arm pivoted eccentrically to said toothed wheel adapted to move into and out of engagement with the teeth of said ratchet wheel, whereby during the running down of said spring, said crank arm derives said toothed wheel and through it said flywheel, and when said spring has run down, said crank arm moves out of engagement with said ratchet wheel to allow said flywheel to drive said axle through said toothed wheel to continue the actuation of the toy as set forth.

5. In a toy driving apparatus, the combination with a toy body, running gear therefor, a spring for driving the running gear for a given period, and a momentum device actuated upon advancing movement of said body to drive the same for a period following the completion of the driving action by said spring, substantially described.

6. In combination, a spring driven toy, and a momentum device for driving the toy subsequent to completion of the driving thereof by the spring.

In testimony whereof I affix my signature in presence of two witnesses.

CHRISTIAN PAUL PFEIL.

Witnesses:
A. HEERLLIN,
OSCAR BOCK.

---

Copies of this patent may be obtained for five cents each, by addressing the "Commissioner of Patents, Washington, D. C."